No. 749,636. PATENTED JAN. 12, 1904.
C. R. SMITH.
COTTON STALK PULLER.
APPLICATION FILED JULY 28, 1903.
NO MODEL. 3 SHEETS—SHEET 1.
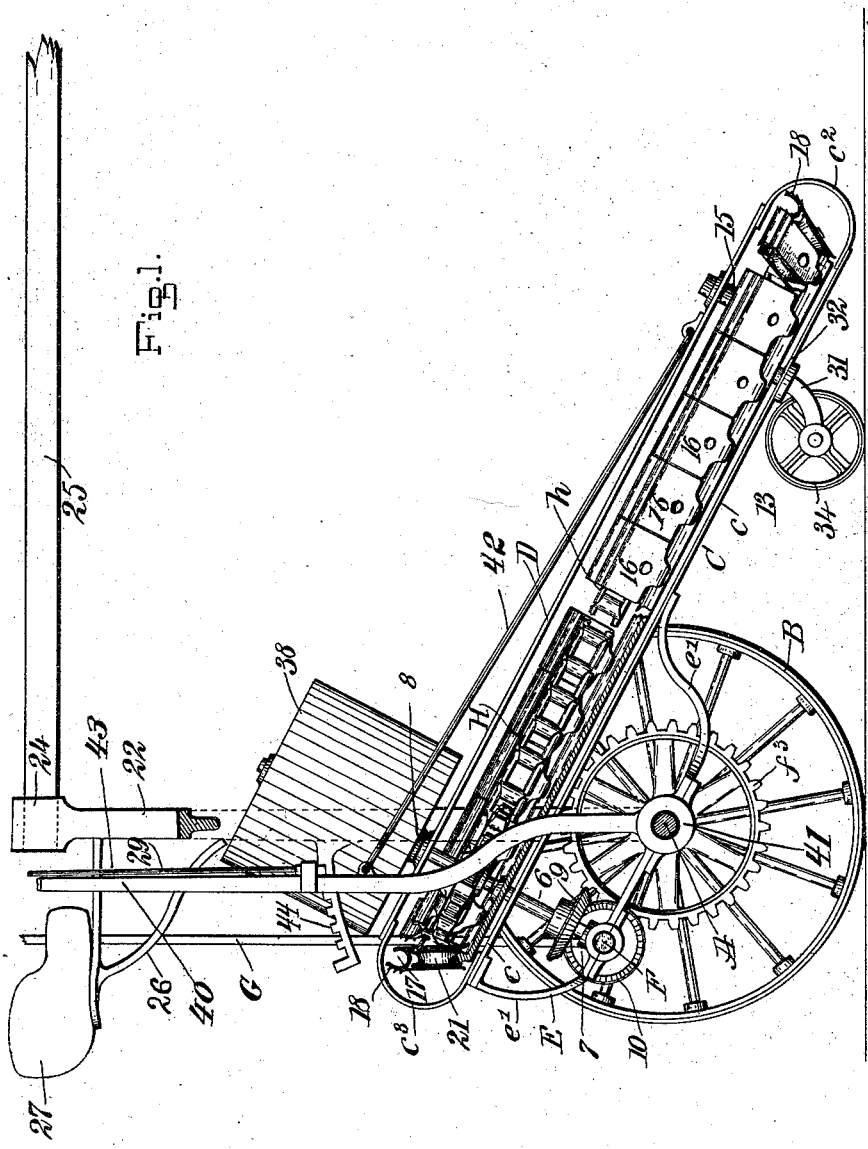
WITNESSES:
INVENTOR
Cullen R. Smith
BY Munn & Co
ATTORNEYS.

No. 749,636. PATENTED JAN. 12, 1904.
C. R. SMITH.
COTTON STALK PULLER.
APPLICATION FILED JULY 28, 1903.
NO MODEL. 3 SHEETS—SHEET 2.
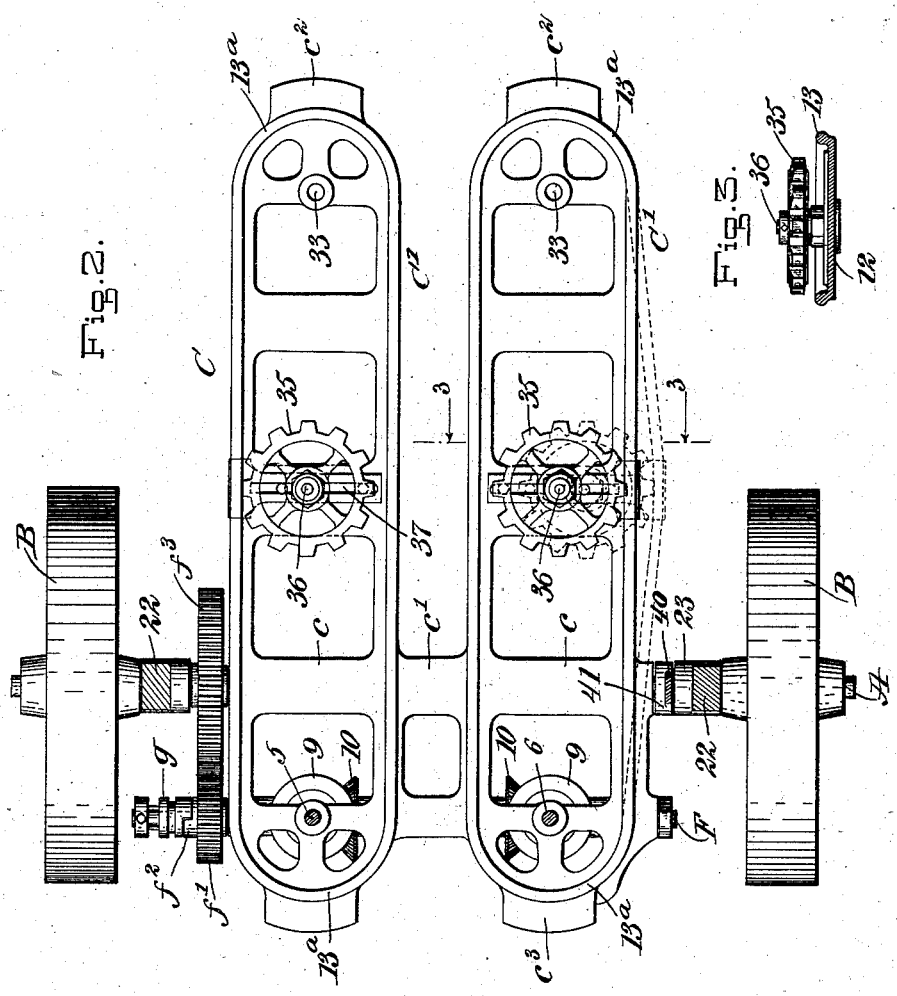
WITNESSES:
INVENTOR
Cullen R. Smith
BY Munn & Co.
ATTORNEYS.

No. 749,636. PATENTED JAN. 12, 1904.
C. R. SMITH.
COTTON STALK PULLER.
APPLICATION FILED JULY 28, 1903.
NO MODEL. 3 SHEETS—SHEET 3.
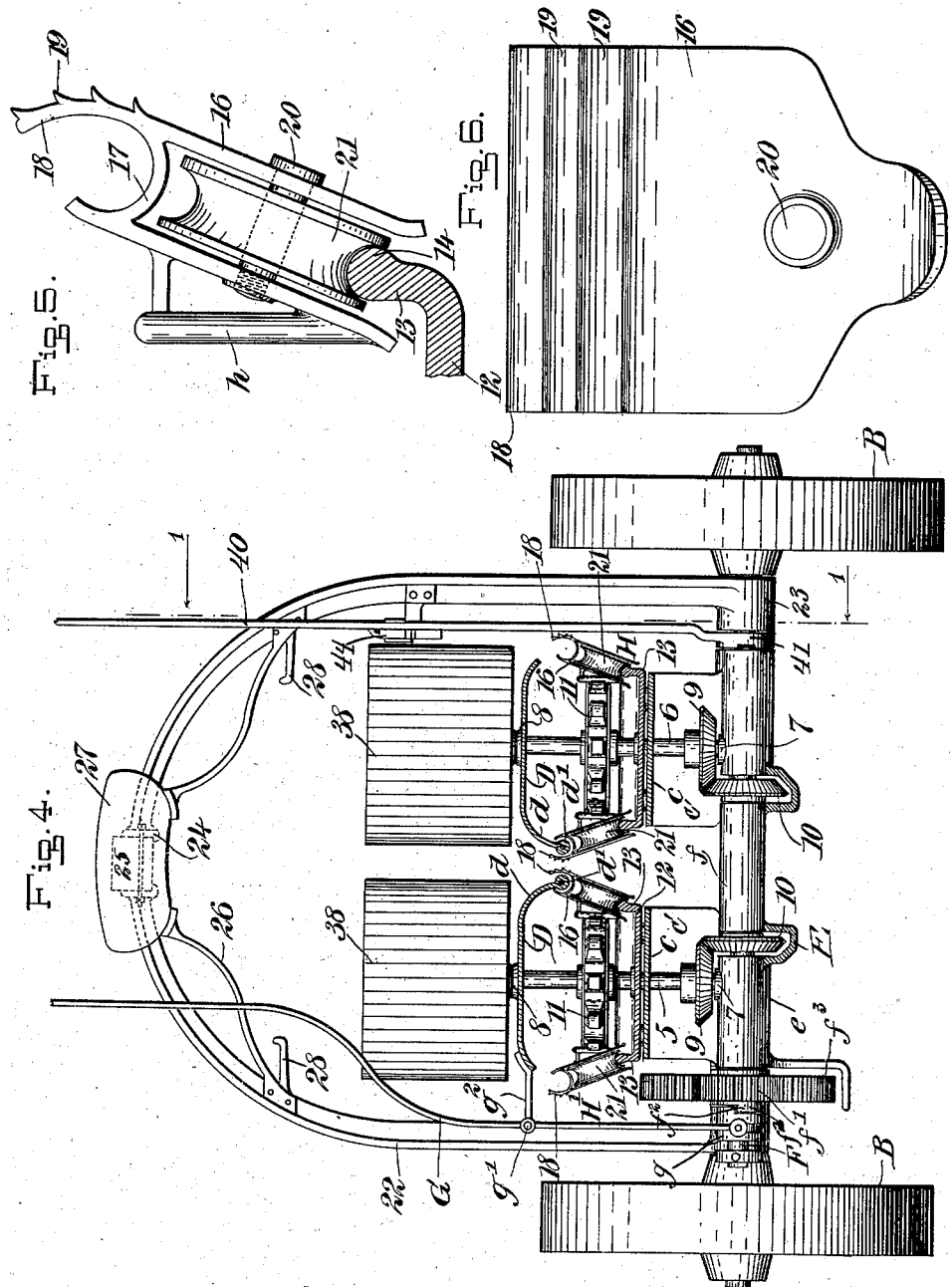
WITNESSES:
INVENTOR
Cullen R. Smith
BY Munn & Co.
ATTORNEYS.

No. 749,636. Patented January 12, 1904.

UNITED STATES PATENT OFFICE.

CULLEN ROGERS SMITH, OF GONZALES, TEXAS, ASSIGNOR TO HIMSELF AND JOSEPH S. LOWERY, OF GONZALES, TEXAS.

COTTON-STALK PULLER.

SPECIFICATION forming part of Letters Patent No. 749,636, dated January 12, 1904.

Application filed July 28, 1903. Serial No. 167,321. (No model.)

*To all whom it may concern:*

Be it known that I, CULLEN ROGERS SMITH, a citizen of the United States, and a resident of Gonzales, in the county of Gonzales and State of Texas, have invented a new and Improved Cotton-Stalk Puller, of which the following is a full, clear, and exact description.

My invention relates to a machine for pulling cotton-stalks from the ground; and the object that I have in view is to provide a new construction by which a powerful pull may be exerted on the stalks for the purpose of extracting the stalks and roots from the ground as the machine travels across the field, whereby the stalks may be collected and cremated for the thorough destruction of insect pests, such as the cotton-weevil, and the ground may be prepared without the labor of first plowing it to eliminate the cotton-stalk roots, as usual.

A further object of the invention is to so construct the pulling mechanism that it serves as a conveyer for discharging the extracted stalks in rear or out of the path of the machine; and a further object is to provide a doffing mechanism for positively removing the stalks from the combined pulling and conveyer mechanism.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is a side elevation, partly in section, of a machine for pulling cotton-stalks embodying my invention, the plane of the section being indicated by the dotted line 1 1 of Fig. 4 looking in the direction of the arrow. Fig. 2 is a sectional plan view on a plane below the endless pulley and conveying mechanism, said view showing the inclined members of the frame, the tracks thereon, the gear arrangements, and incidental parts thereto. Fig. 3 is a transverse section on the line 3 3 of Fig. 2, illustrating one of the chain-tightener sprockets. Fig. 4 is a sectional rear end elevation of the improved machine. Fig. 5 is an enlarged detail view through a portion of one of the tracks, illustrating one of the sprocket-chain links and a wheeled yoke adapted to travel on said track; and Fig. 6 is an enlarged detail face view in elevation of one of the yokes, illustrating the stalk gripping and pulling member thereof.

A designates a driving-axle which is provided at its end portions with suitable carrying-wheels B, the latter being adapted to rotate the axle on the advancement of the machine across the field. The axle serves, primarily, as a means for supporting an inclined frame C, the same consisting of two members C', which are joined at their rear portions and are disposed in the same transverse plane. This frame inclines downwardly and forwardly from the main axle, so that the front end of the frame will travel close to the ground. The members C' of the frame consist of cast-metal bed-plates $c$, which are joined near their rear ends by suitable webs $c'$. (See Fig. 2.) Each member of the frame has it lower front end extended or curved upwardly, as at $c^2$, while its elevated rear end is similarly curved upwardly at $c^3$, and on the upturned ends of the two frame members C' are secured the covers or hoods D, the latter being supported by said upturned ends of the frame members in substantial parallel relation to the bed-plate $c$. (See Figs. 1 and 4.)

The covers or hoods D are inclined downwardly and forwardly correspondingly to the members of the frame, and these rods have their inner adjacent sides curved downwardly and inwardly toward the median line of the machine, so as to form the flanges $d$, the latter being separated or spaced relatively to each other in a way to form a slot, throat, or space longitudinally of the machine, substantially as indicated by Fig. 4. The curved flanges $d$ of the hoods are provided with longitudinal guides $d'$ of circular form in cross-section, and with these guides are adapted to engage the yokes, which form the puller and conveyer elements of the machine, the guides $d'$ thus serving to direct said elements in parallel paths as they travel upwardly and rearwardly from the front toward the rear of the machine.

The members C' of the inclined frame are supported on the axle A by any suitable means; but in the drawings I have shown the machine as being equipped with an auxiliary underframe E, the same having suitable sleeves $e$, adapted to fit loosely on the main axle A, and the end portions of this frame are bent or extended upwardly, as at $e'$, so as to provide for the rigid attachment of the bed-plate $c$ of the frame members C' to the auxiliary frame E. Said auxiliary frame is provided with suitable shaft-bearings $f$ for the accommodation of a main drive-shaft F, the latter being parallel to the axle A. This drive-shaft F is provided with a spur gear-pinion $f'$, which is loosely mounted on said shaft F, and is provided with a clutch-face $f^2$, with which is adapted to engage a slidable clutch $g$, the latter being splined on the shaft F. The clutch is adapted to be shifted on the drive-shaft by the operation of an upright lever G, the same being fulcrumed, as at $g'$, to an offstanding arm $g^2$, attached either to the frame of the machine or to one of the fixed hoods D. (See Fig. 4.) The pinion $f'$ has intermeshing engagement with a spur-gear $f^3$, which is made fast with the main axle A, whereby the axle is adapted to drive the shaft F when the clutch $g$ is in engagement with the gear-pinion $f'$. (See Fig. 2.)

5 6 designate upright shafts which have their lower ends stepped in suitable bosses 7, provided on the bearings $f$ of the auxiliary frame E, said shafts passing loosely through the members C' of the inclined frame and having their upper ends journaled in appropriate bearings 8, which are provided on the hoods D. These upright shafts are provided at their lower ends with bevel-gears 9, which intermesh with other bevel-gears 10, that are fast with the drive-shaft F, whereby the motion of the axle A is transmitted through the drive-shaft to the upright shafts 5 6. Sprocket-gears 11 are secured rigidly to the upright shafts 5 6 at points above the bed-plate $c$ of the inclined frame C, and these sprocket-gears are operatively engaged with endless sprocket-chains, which carry the puller and conveyer members of my improved machine at the same speed as the rim of the drive-wheel.

The bed-plates $c$ of the inclined frame support or carry suitable tracks, the same being shown in the form of flat plates 12, having upstanding flanges 13. These plates 12 are superposed on the bed-plates $c$, and they extend longitudinally thereof. The flanges 13 extend along the two side edges of the track-plates 12, and they are curved at $13^a$ around the end portions of the plate, as shown by Fig. 2, thereby forming endless rails on the members C' of the inclined main frame, each rail 13 being enlarged and rounded at its upper edge to form a track-surface 14, which is shown more clearly by Figs. 4 and 5.

My machine is equipped with a pair of endless sprocket-chains H H', each of which passes around one of the sprocket-wheels 11 at the upper rear part of the machine, while its opposite end portion is adapted to be guided around an idle sprocket-gear (not shown) mounted on a bolt or spindle, the position of which is indicated at 15 in Fig. 1. The sprocket-chains H H' conform to the inclination of the main frame C, and they are adapted to travel at equal speeds and in parallel paths. Each sprocket-chain is constructed in a novel way in order that the two chains may serve as a means for extracting stalks and the roots thereof from the ground and as a means for conveying the pulled stalks toward the rear of the machine.

Each link $h$ of each chain is cast in a single piece with a yoke 16, said yoke being inclined upwardly and laterally from the link $h$, as shown more clearly by Figs. 4 and 5. The yoke is offset from the chain-link, and it consists of a pair of legs united at their upper portions by a curved head 17, which is prolonged or extended to form an arm 18, having a series of teeth or spurs 19, said arm forming a gripping member, which is integral with the yoke. The legs of the yoke 16 are provided with suitable transverse openings below the curved head 17 for the reception of a short arbor or axle 20, on which is loosely mounted a grooved wheel 21, the latter being disposed within the yoke 16 and mounted for rotation on an axis which is inclined to the plane of the link $h$, forming a part of the sprocket-chain. The links of each sprocket-chain H or H' are coupled in series in any ordinary way, so as to make an endless chain having a large number of wheeled yokes, as shown by Fig. 1. The wheels of the series of yokes are adapted to travel on the track-surfaces 14 afforded by the flanged portions 13 $13^a$ of the track-plates 12, and these yokes thus assist in supporting the sprocket-chains between the driving-sprockets 11 and the idler-sprockets heretofore mentioned, thus reducing the friction on the parts and causing each chain to travel in a proper path.

The yokes and wheels on the adjacent leads of the two endless chains H H' are disposed in oppositely-inclined positions, so as to converge upwardly, as shown by Fig. 4 of the drawings, and the gripping members 18 of the adjacent yokes on the respective chains are thus brought in exceedingly close relation, so as to properly engage with the stalks of the cotton-plants. The links of the sprocket-chains occupy vertical positions in order to properly pass around the sprocket-wheels, whereas the inclination of the yokes brings the gripping members in such relation as to make the toothed or spurred surfaces of the gripping members have proper engagement with the stalks in a way to exert a powerful pulling action thereon, whereby the efficiency of the gripping members in extracting the stalks and their roots from the ground is insured. The guides $d'$ on the covers or hoods D fit loosely in the curved heads 17 of the series of yokes to assist the track-surfaces 14 in keeping the yoke-wheels on the bed-plates and in proper relation, said guides $d'$ at the upper rear part of the machine preventing the wheeled yokes from jumping the track-surfaces at the curved portions $13^a$ thereof.

22 designates an upright arch forming a part of the machine-frame, said arch being provided at its lower portion with short sleeves 23, adapted to fit loosely on the main axle A. The arch extends transversely across the working parts of the machine, and at its upper middle portion said arch is formed with a socket 24 to receive a portion of the draft-tongue 25, the latter being thus attached at an elevated point to the machine and extending forwardly from the working parts of the machine in order to provide for proper hitching of the draft-team. This arch may be provided with a seat-bracket 26, which is designed to carry a seat 27, and, if desired, the arch may be constructed with suitable foot-rests 28. The clutch-operating lever G extends upwardly from the clutch $g$ to a point within convenient reach of the driver on the seat, and with this lever may be associated a locking device for the purpose of holding the clutch $g$ in either of its adjusted positions.

The lower front part of the machine-frame is adapted to be supported by wheeled casters, as shown by Fig. 1. Each caster or hanger 31 has a short spindle 32, adapted to fit in an opening 33, provided in the bed-plate $c$ of each frame member, as shown by Fig. 2, and this hanger is equipped with a caster-wheel 34 of small diameter as compared with the driving-wheel B, whereby the inclined frame is supported by the wheeled axle A and the caster-wheel 34 in a way for the lower front end of the frame and the two sprocket-chains H H' to travel close to the ground, so that the gripper members 19 of the yokes on said sprocket-chains will engage with the cotton-stalks at points close to the ground. The gripper members of the wheeled yokes are capable of a certain amount of play in order to accommodate themselves to cotton-stalks of different diameters; but the gripper members are held in proper positions by the wheeled yokes traveling on the tracks and by keeping the sprocket-chains in taut conditions. The slack in each sprocket-chain is adapted to be taken up by an adjustable idler-sprocket 35, the same being loosely mounted on a spindle 36, which is arranged to be adjusted in a slot 37, provided in a cross-bar of the bed-plate $c$, forming a part of each inclined frame member C'. (See Figs. 2 and 3.) It is evident that the tightener-sprockets 35 may be individually adjusted with relation to the sprocket-chains H H' in a way to take up the slack therein, thus keeping said chains in taut conditions.

Another element of my improved machine is a doffing mechanism having operative relation to the path of the cotton-stalks conveyed by the gripper members of the coöperating sprocket-chains. This doffing mechanism is embodied in the form of corrugated drums 38, which are rigidly and detachably mounted on the upper ends of the upright shafts 5 6, so as to lie above the hoods D and on opposite sides of the path of the cotton-stalks as they travel through the space, throat, or slot which is formed by and between said hoods. Any suitable means may be employed for rigidly connecting the doffing-drums to the shafts in a way to permit the drums to be dismounted when it is not desired to use them. These drums are attached to the shafts for rotation therewith at a speed equal to that of the driving-sprockets 11, and as the cotton-stalks are carried upwardly and rearwardly they are engaged by the corrugated or roughened surfaces of the drums, which operate to disengage the stalks from the gripper members and to throw the stalks rearwardly from the machine and out of the path of said gripper members, thus insuring the discharge of the stalks and preventing them from being carried backwardly with the traveling grippers.

As shown by the drawings, I have provided the machine with means for lifting the front portion of the inclined frame, the latter being loosely mounted on the machine-axle. An upright lever 40 is disposed on the opposite side of the machine from the clutch-actuating lever G, said upright lever being provided at its lower portion with a collar 41, that is fitted loosely on the axle. The link or rod 42 is pivoted at its rear portion to the lever 40 at a point intermediate of the length thereof, (see Fig. 1,) while the lower front end of this link is connected with a suitable part of the inclined frame. The lever 40 is provided with a suitable latch-rod 43, adapted to fit into either of a series of notches on a segment 44, the latter being fastened to the vertical arch of the machine-frame. It is evident that the lever 40 may be moved in a rearward direction in order to pull on the rod 42 and raise the front end of the inclined frame, and this frame may be locked in a raised position by the engagement of the latch-rod 43 with the segment 44.

The operation of the invention may be described as follows: The machine is drawn across the field and the clutch $g$ is thrown into engagement with the pinion $f'$, so that the shaft F will be driven from the axle through the intermeshing gears $f'$ $f^3$. The shafts 5 6 are driven from the shaft F, and the sprocket-gears 11 are rotated at equal speeds, so as to make the endless chains H H' travel uniformly. The grippers 18 on the yokes, connected to the lower links of the inclined traveling chains, engage successively with the stalks as the machine is drawn along, and these grippers operate to extract the stalks and their roots from the ground, the stalks being carried upwardly and rearwardly by the traveling grippers until they reach the doffing rollers or cylinders 38, which engage with the branches of the stalks and disengage them from the grippers, thus insuring the proper discharge of the extracted stalks from the machine.

Having thus described my invention, I claim as new and desire to secure by Letters Patent—

1. A pulling-machine having a pair of endless carriers, and a plurality of grippers on the carriers, said grippers on the adjacent leads of the carriers being disposed in pairs, and the grippers of each pair having upwardly-converging and coöperative relation.

2. A pulling-machine having two endless series of traveling grippers disposed in pairs, the grippers of each pair having upwardly-converging and coöperative relation, and means for laterally confining the individual grippers from displacement and retaining them in such coöperative relation during their travel as a pair of grippers.

3. A pulling-machine having a wheeled frame, a plurality of endless carriers mounted on the frame, means for driving the carriers, and grippers on the carriers, the grippers on the adjacent leads of the carriers being disposed in pairs, and the grippers of each pair having upwardly-converging active faces disposed in coöperative relation.

4. A pulling-machine having an inclined wheeled frame, a plurality of endless carriers mounted on said frame and partaking of the inclination thereof, means for driving the carriers at equal speed from a machine-axle, and a series of grippers movable with the carriers and riding on the frame, said grippers being disposed in pairs on the adjacent leads of the carriers and the grippers of each pair being disposed in converging coöperative relation.

5. A pulling-machine having a frame, a plurality of endless carriers mounted thereon, means for driving said carriers, grippers movable with the carriers and disposed in pairs on adjacent leads thereof, and revoluble doffing members adjacent to the delivery ends of the carriers and grippers.

6. A pulling-machine having a wheeled frame, carrier-driving shafts driven from a machine-axle, endless carriers mounted on the frame and driven by said shafts, grippers movable with the carriers and disposed in coöperating pairs on the adjacent leads thereof, and revoluble doffing members mounted on said carrier-driving shafts at the delivery ends of said carriers.

7. A stalk-pulling machine comprising an inclined frame having endless tracks, two series of wheeled yokes adapted to said tracks and provided with grippers which on the adjacent sides of the yokes of the pair are disposed in coöperative relation, and means for driving the two series of yokes at uniform speed.

8. A stalk-pulling machine comprising a main frame having endless tracks, sprocket-chains mounted on said frame, means for driving the sprocket-chains at equal speed, wheeled yokes movable with the sprocket-chains and adapted to travel on the tracks, and grippers carried by said yokes, adjacent grippers of the sprocket-chains being disposed in converging relation.

9. A stalk-pulling machine comprising an inclined frame, hoods fixed to said frame, endless carriers disposed on the frame within the hoods thereof, means for propelling the endless carriers at equal speed, and grippers movable with said endless carriers and disposed outside of the hoods thereof for coöperative relation.

10. A stalk-pulling machine consisting of an inclined frame, upright shafts supported by said frame, means for driving said shafts, endless carriers propelled at equal speed by said shafts, wheeled yokes movable with the carriers and traveling on the frame, and grippers movable with said yokes and disposed for coöperation one with the other.

11. A stalk-pulling machine comprising a suitable frame, track-surfaces on said frame, endless carriers supported on said frame above the track-surfaces thereof, yokes movable with the carriers and adapted to said track-surfaces, said yokes being provided with gripper members, and means for driving the carriers at equal speed.

12. A stalk-pulling machine comprising an inclined frame having track-surfaces, endless carriers on said frame, wheeled yokes movable with said carriers and adapted to travel on the track-surfaces, each yoke being provided with a head and with a gripper member, and stationary hoods having guides arranged to fit the heads of the yokes.

13. A stalk-pulling machine comprising a main axle, an inclined frame supported partly by said axle and equipped with suitable casters, track-surfaces on said frame, upright shafts driven by said main axle, endless carriers driven by said upright shafts, and wheeled yokes movable with said carriers and arranged to travel on the track-surfaces, each yoke being provided with a gripper member, and said yokes being inclined relatively to the part of the carrier to which it is attached.

14. A stalk-pulling machine comprising an inclined frame, upright shafts supported thereby, endless carriers supported by said frame and driven by said shafts, traveling grippers movable with the carriers and disposed for the grippers of one carrier to coöperate with the grippers of the other, and doffing-drums revoluble with said upright shafts and disposed in the path of cotton-stalks which are conveyed by the grippers of said carriers.

15. A stalk-pulling machine comprising a wheeled inclined frame, endless carriers supported thereon, upright shafts for driving said endless carriers at uniform speed, means for taking up slack in the endless carriers, and wheeled yokes movable with the carriers and arranged to travel on said frame, the yokes of said carriers being provided with coöperating grippers.

In testimony whereof I have signed my name to this specification in the presence of two subscribing witnesses.

CULLEN ROGERS SMITH.

Witnesses:
J. S. LOWERY,
J. M. JOHNSON.